Aug. 29, 1933.  N. A. CURTISS  1,924,678
APPARATUS FOR PITTING FRUIT
Filed Oct. 10, 1930  4 Sheets-Sheet 4
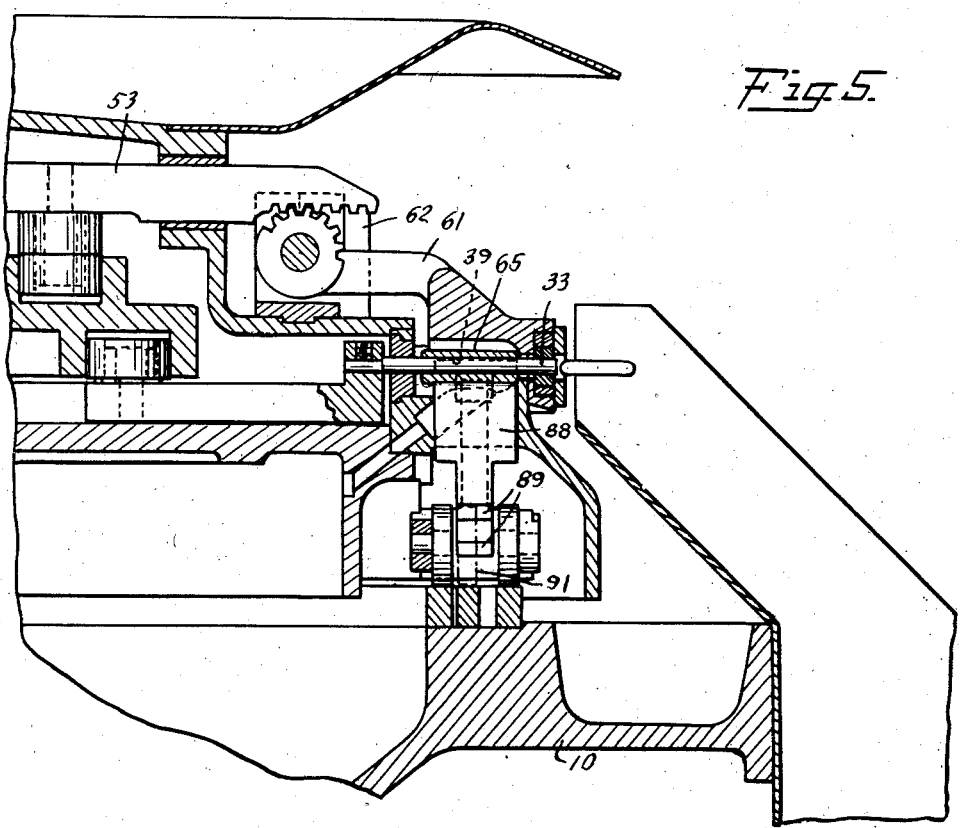
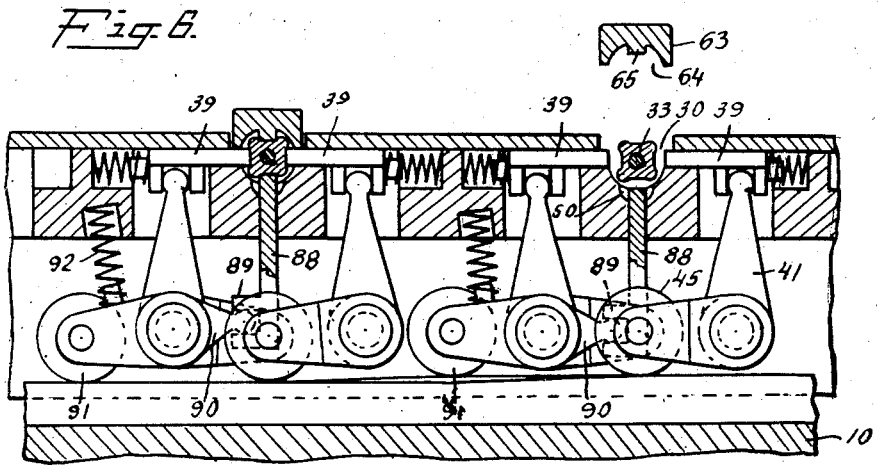
INVENTOR
Nathan A. Curtiss
BY
ATTORNEYS Patented Aug. 29, 1933

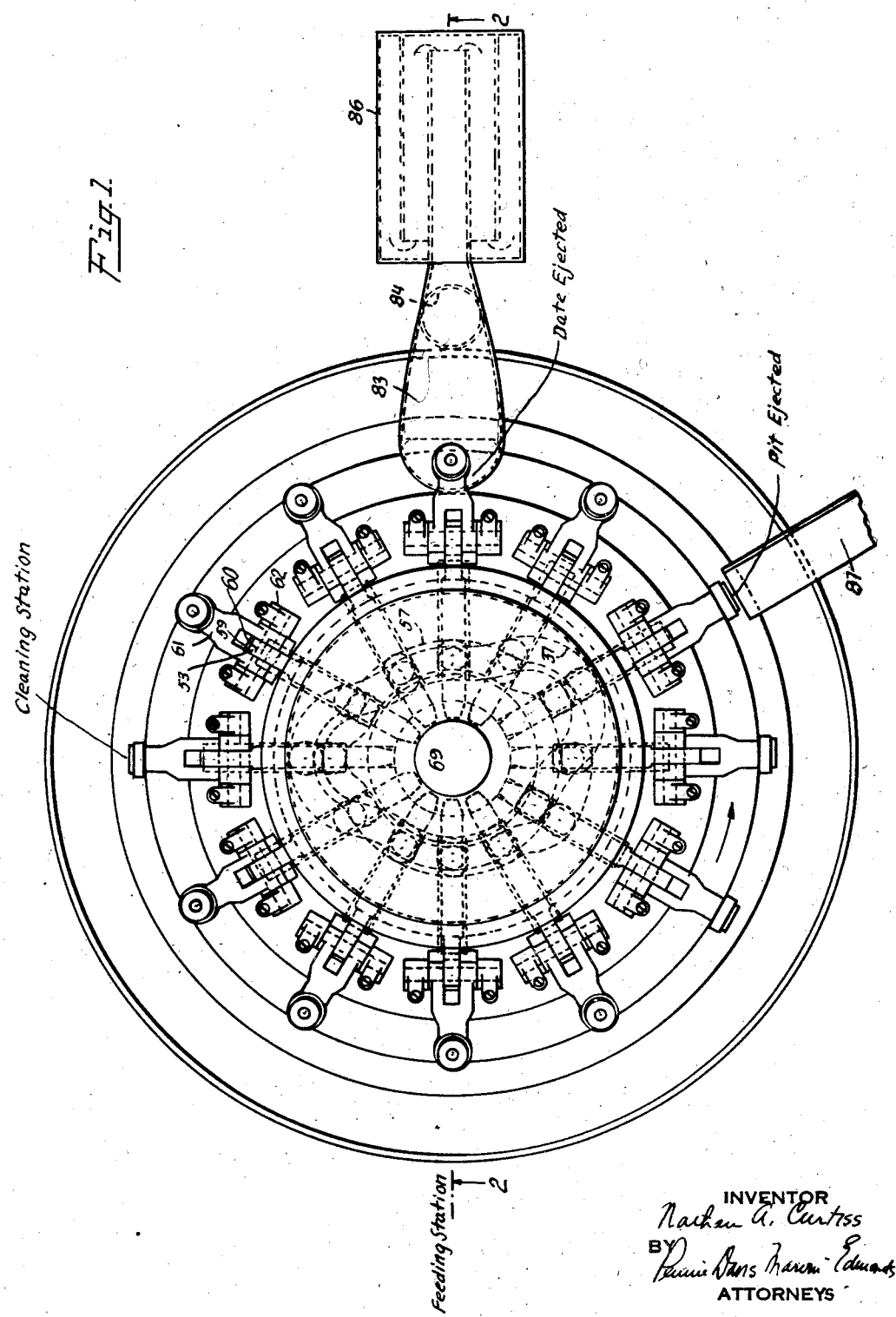

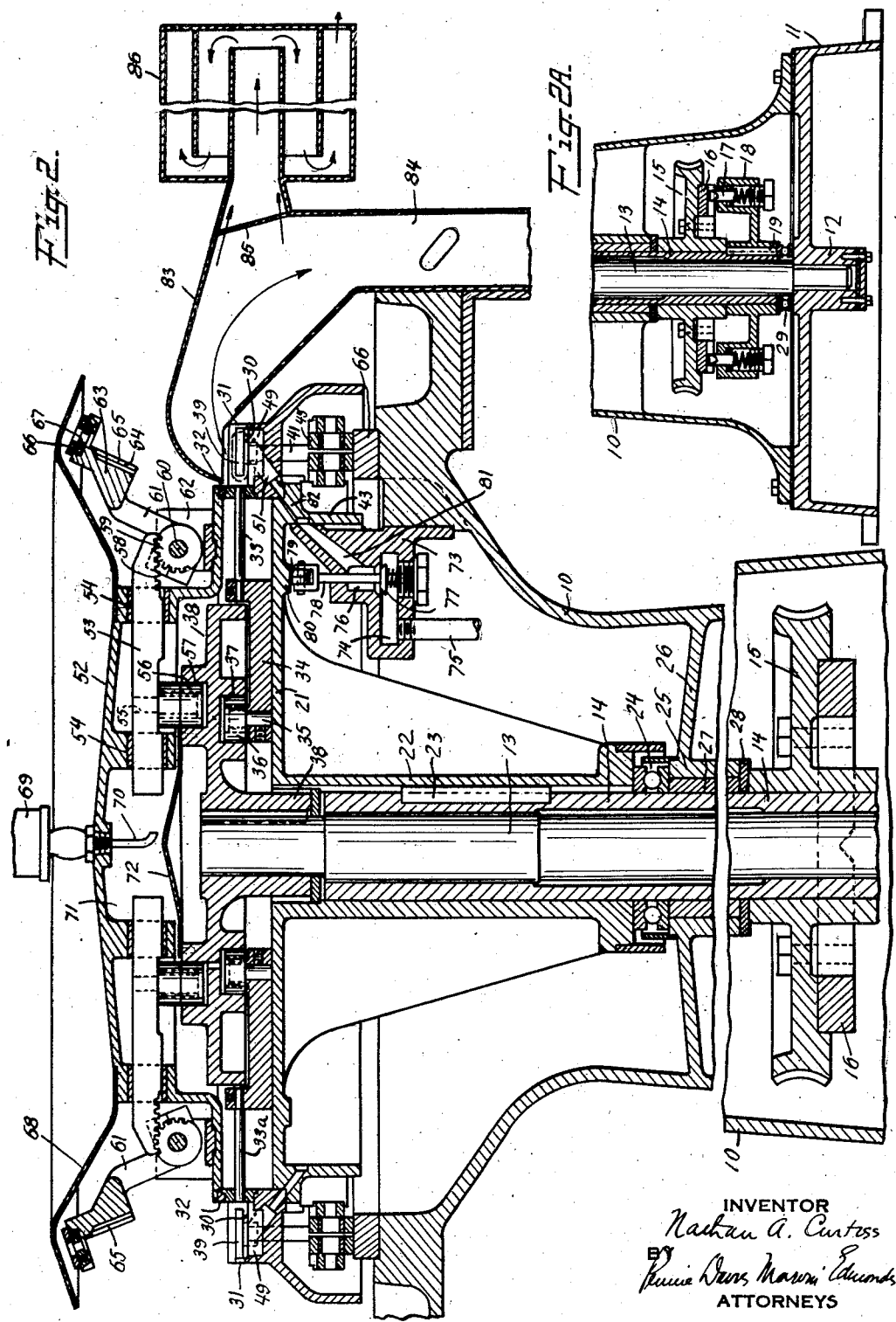

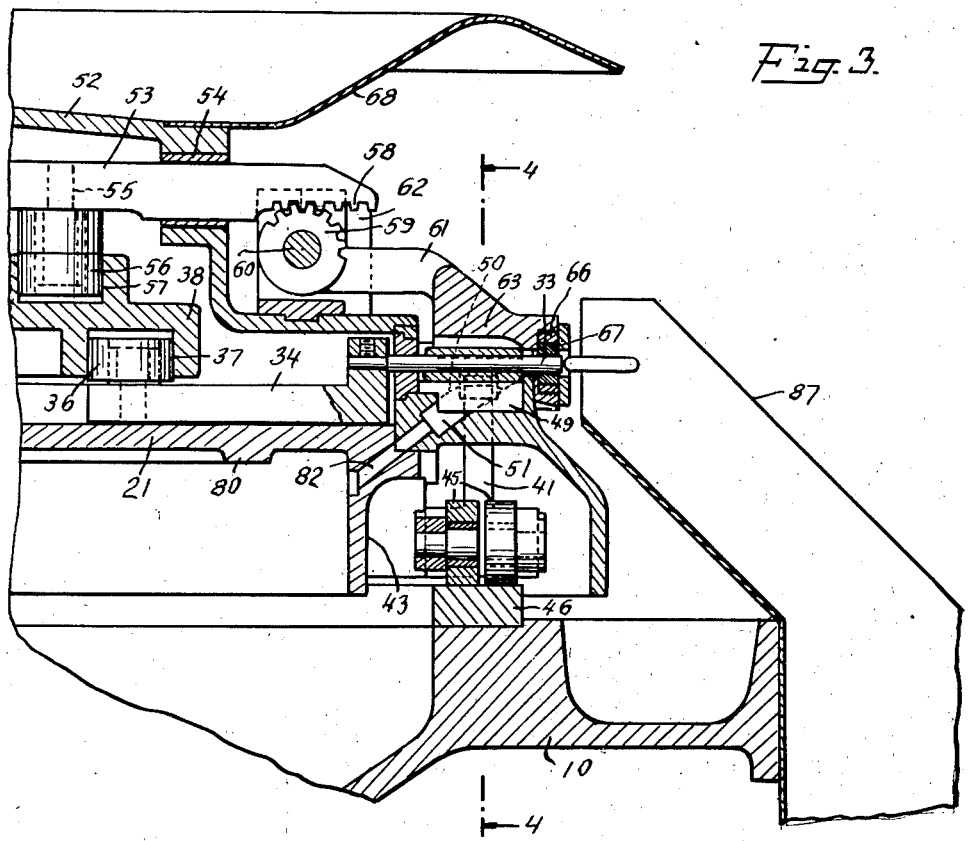

1,924,678

UNITED STATES PATENT OFFICE 1,924,678

APPARATUS FOR PITTING FRUIT

Nathan A. Curtiss, Ridgewood, N. J., assignor to The Hills Brothers Company, New York, N. Y., a corporation of New York Application October 10, 1930. Serial No. 487,753

26 Claims. (Cl. 146—17)

This invention relates to apparatus for removing pits from fruit and is concerned more particularly with a machine by which dates may be pitted at a high output rate and without substantial loss of fruit due to damage sustained in the pitting and other operations to which the dates are subjected.

At the present time, the popularity of pitted dates is rapidly increasing and the demand has heretofore been met by dates pitted by hand. Removing the pits in this manner is a relatively slow, tedious operation which represents a substantial proportion of the cost of the final product, but so far as I am aware, there have been no machines available for the purpose which are commercially successful. The principal obstacles encountered in constructing such a machine arise from the character of the dates, which are soft, sticky and easily injured, and quickly coat the parts with which they come in contact with a sticky gummy film which makes automatic handling extremely difficult.

Another difficulty presented resides in the variations in size of the individual dates, and in the size and location of the pits in the fruit. As the dates are received in this country, they are compressed into solid masses which have to be broken apart for treatment preliminary to the pitting and in such handling, the meat is liable to be distorted and the pits, normally at the center of the fruit, are liable to lie near the surface. Also, the pits vary greatly in length and circumference and frequently have somewhat irregular shapes.

After considerable experimentation, I have devised a machine by which dates may be pitted rapidly and with little loss, the dates being fed to the machine one by one and then pitted and discharged by wholly automatic means. In this machine, the dates are advanced from the feeding station to the point of discharge with a continuous movement and during this movement, the dates are acted on successively by elements which center the pits, eject the pits, remove the pitted fruit, and clean those parts with which the dates have come into contact, thus continually maintaining the mechanism in sanitary condition and preventing it from becoming coated with sticky date substance.

In the preferred embodiment of the invention, the machine includes a conveyor which contains a plurality of pockets for the reception of individual dates, each pocket being provided with a pitting plunger and pit centering devices. This conveyor may conveniently take the form of a dial or head rotating in a horizontal plane and having radial pockets along its periphery, each pocket opening through the upper face and outer edge of the dial. Disposed on the dial adjacent each pocket is a pivoted arm which carries an apertured disc of resilient material at its end and after a date has been inserted in the pocket, the arm is swung down to close the open top of the pocket and to place the disc over the open end of the pocket. The arm is provided with a pit centering fin or blade which engages the date as the arm descends and cooperates with a stationary blade in the bottom of the pocket to center the pit in a horizontal plane, while two movable blades seated in apertures in the opposite side walls of the pocket enter the latter at the appropriate instant and cooperate to center the pit in a vertical plane.

A pitting plunger is mounted in the head to the rear of each pocket and after the pit is centered, the plunger advances, pierces the end of the date, engages the pit and forces it through the aperture in the pitting disc, the imperforate portion of the disc holding the date against movement and the edge of the aperture stripping the pit clean. The centering and pitting operations are carried on while the head is rotating and when they are completed, and the swinging arm is raised to normal position and the plunger and centering blades retracted, a blast of air is directed against the date from beneath and throws it into a discharge chute. Thereafter the walls of the pocket, the centering blades and pitting plunger and those parts of the arm which come into contact with the date are subjected to a steam blast which removes adhering particles of date material, and sterilizes the parts. The pocket is then brought to the feeding station and receives another date, after which the cycle of operations is repeated.

For a better understanding of the invention, reference may be had to the accompanying drawings, in which Fig. 1 is a plan view of the apparatus with certain parts removed;

Fig. 2 is a vertical sectional view through the upper part of the apparatus on the line 2—2 or Fig. 1;

Fig. 2a is a view similar to Fig. 2 showing the lower part of the apparatus;

Fig. 3 is an enlarged sectional view through a portion of the apparatus illustrated in Fig. 2 but showing the parts in a different stage of the operation;

Fig. 4 is a sectional view on the line 4—4 of Fig. 3;

Fig. 5 is a sectional view similar to Fig. 3 showing a modification; and

Fig. 6 is a sectional view similar to Fig. 4 illustrating the modification shown in Fig. 5.

In the embodiment of the invention illustrated in the drawings, the machine includes a hollow housing 10 which is bolted on a base 11 secured to the floor, the housing being of a height such that the pitting mechanism is conveniently located for the operator. The base is formed with a central boss 12 which receives the lower end of a stationary vertical shaft 13. Surrounding this shaft is a sleeve 14 on which is loosely mounted a worm gear 15 adapted to mesh with a driving worm not illustrated. On the under surface of the gear are plates 16 provided with notches in which are received the wedge-shaped ends of spring-pressed pins 17 carried by a disc 18 which is keyed at 19 to the sleeve 14. The worm gear 15 drives the sleeve 14 through the parts described but should the driven mechanism become clogged or jammed the spring-pressed pins will slip out of their notches to break the driving connection.

The pitting mechanism includes a dial 21 provided with a boss 22 which fits over the upper end of the shaft 13 and sleeve 14, the boss being keyed to the sleeve by a key 23. The dial rests on a ball bearing assembly 24 supported on a hub 25 carried by a spider 26 formed as part of the housing 10, and below the ball bearing within the hub of the spider is a stationary collar 27. Below this collar is a packing washer 28, this arrangement preventing loss of lubricant from parts lying above it. A second ball bearing assembly 29 lies beneath the lower end of the sleeve 14 and the hub of the driving disc 18.

In the periphery of the dial 21 are formed cup-shaped seats or pockets 30 for the reception of the dates to be pitted. These pockets are open at the top and the rim of the head is partially cut away opposite each pocket as indicated at 31. In the rear wall 32 of each pocket is an opening for the reception of a pitting plunger 33 and each pocket is formed to correspond generally to the shape of a date with the longer dimension of the pocket lying in alignment with the axis of the plunger. The plunger is mounted on a slide 34 movable in radial guideways in the dial 21 and is provided at its rear end with a pin 35 which carries a roller 36 movable in a cam slot 37 in a cam plate 38 keyed to the upper end of the stationary shaft 13 and lying above and spaced from the dial 21. The cam slot in which the roller 36 runs is formed in the under surface of the stationary cam plate 38 and as the dial is rotated, the slide 34 is moved in and out radially at appropriate intervals and carries with it the pitting plunger which forces the pit from a date in the pocket.

Mounted in openings in the side wall of each pocket are centering slides 39 (Fig. 4). Each slide has an end elongated parallel to the length of the pocket and the slide is provided with a pair of spaced lugs 40, between which lies the ball-shaped end of one arm 41 of a bell crank pivoted at 42 on a flange 43 depending from the under surface of the dial 21 and spaced inwardly from the periphery thereof. The other arm of the bell crank carries a roller 45 which runs on a cam track 46 carried by the upper end of the housing 10. Each of the slides 39 is provided with a stud 46' at its rear end which centers a spring 47 which is housed in a cavity 48 formed in the rim of the dial 21.

In the lower wall of the pocket is a centering blade or fin 49 which is elongated in a direction lengthwise of the pocket and extends into the pocket a short distance. This blade straddles an opening 50 at the end of a passage 51 formed through the wall of the dial and leading downwardly and inwardly.

Secured to the rim of the dial 21 at the rear end of the row of pockets is a cover plate 52 which is provided with a plurality of radial slides 53, one for each pocket in the dial 21, each slide lying in alignment with a pocket. Each slide is mounted to move in guideways 54 on the under surface of the cover plate and the slide is provided with a pin 55 carrying a roller 56 which enters a cam track 57 on the upper surface of the stationary cam plate 38. Each slide is provided in the under surface at its outer end with rack teeth 58 which mesh with a pinion 59 on a stud 60 rigidly secured to an arm 61. The arm is supported in a standard 62 attached to the cover plate 52 and each arm is provided at its outer end with a cover 63 adapted to fit into a date pocket. The under surface of this cover is concave as indicated at 64 and into the concavity extends a centering blade 65 which lies with its length parallel to the length of the pocket. The end of the arm 61 beyond the cover portion is formed with an opening into which is threaded a bushing 66 in the inner wall of which is seated a perforated disc 67 of resilient material. This disc is preferably of rubber of a good quality and the opening formed through it is slightly smaller than the average size of a date pit.

Mounted on the top of the cover plate 52 is a shield 68 so formed as to permit the free upward movement of the arm 61 and mounted centrally of the cover plate 62 is a lubricator 69 having a feed tube 70 through which lubricant is discharged into a chamber formed by the central cavity 71 in the cover plate and a baffle plate 72 secured to the cam plate 38. Lubricant entering this chamber lubricates the various slides, cam rollers, cam tracks, and the like.

Beneath the dial 21 and secured to the housing 10 at spaced points are two valve casings of similar construction, so that only one need be described. The casing 73 includes a chamber 74 to which a supply pipe 75 leads and from this chamber is an outlet passage 76 controlled by a spring-pressed valve 77 having a stem 78 carrying a roller 79 which bears on a cam track 80 formed on the under surface of the dial 21. A passage 81 leads from beyond the valve in a position to register with the passage 82 formed in a depending portion of the dial 21 in alignment with the chamber 51 just below the date pocket. As the dial 21 rotates, the valve 77 is depressed from time to time by the action of the cam track 80 and the roller 79 and this permits air to flow up into the chamber 51 beneath the date in the pocket. The air is used for ejecting the date from the pocket and the ejected date is thrown into a chamber 83 having a discharge passage 84, while the air blast passes directly out of the chamber past a baffle 85 into a muffler 86. The muffler, while not essential, substantially silences the operation of the device and is in many instances desirable for that reason.

The second valve casing lies beyond the first in the direction of rotation of the dial and serves to direct a steam blast upon the parts used in pitting.

Disposed at another point adjacent the periphery of the dial 21 is a chute 87 for the reception of the pits, this chute extending close to the edge of the dial so that it will knock off pits which have been ejected from dates but which have not become entirely freed from the stripping disc 67.

In the operation of the device, the attendant inserts dates one by one into the pockets in the rotating dial, the feeding station being located diametrically opposite to the point of discharge, for example. At the feeding station, the pitting plunger lies in retracted position as illustrated at 33a (Fig. 2) and the arm 61 is raised so that the pocket is open at the top. The movable centering blades 39 also lie retracted so that there is no difficulty in inserting dates of different sizes in the pockets. As the dial rotates carrying the filled pocket away from the feeding station, the arm 61 is lowered by the outward movement of its slide 53 which causes the pinion attached to the arm to rotate. In this lower position of the arm, the centering blade 65 which it carries bears down upon the top of the date and occupies the position illustrated at the left in Fig. 4. The centering blade forces the date down against the stationary blade 49 at the bottom of the pocket and ordinarily deforms the date so as to force the pit into a central horizontal plane through the pocket.

At about the same time in the operation of the mechanism, the centering slides 39 located at opposite sides of each pocket approach each other and engage the sides of the date and exert pressure to center the pit in a central vertical plane through the pocket. The approaching movement of the blades is effected by the springs 47 so that the blades bear against the date yieldingly, the blades being retracted positively by the bell cranks which engage the lugs on the blades. When the arm 61 is in its lower position and the centering blades have moved inwardly to bear against the date, the date pit is properly centered with reference to the pitting plunger and the opening in the resilient disc carried by bushing 66 in the depending portion of the arm 61. Upon further movement of the dial, the slide 34 is moved outwardly by the cam groove in the under side of the cam plate 38 and forces the pitting plunger 33 into the pocket, the plunger piercing the rear end of the date, engaging the pit, and forcing the pit outwardly in the opening in the resilient disc. During such movement, the pit is held centered by the blades which engage it from four sides and in its passage through the opening in the disc, the walls of the opening strip from the pit any meat that might otherwise adhere thereto. By reason of the manner in which the date is held during the pitting operation, the soft meat thereof is not likely to be injured except for punctures at opposite ends made by the plunger and the pit being ejected. The ejected pit is either thrown clear into the chute 87 or else knocked loose by the side wall of the chute. Preferably the plunger is sufficiently long so that in its extreme upward position it passes through the opening in the disc as shown in Fig. 3 so that the disc strips from the end of the plunger any meat which might adhere thereto.

Upon completion of the ejecting operation, the centering blades 39 are retracted by the action of their bell cranks and moved to a position free of the date as illustrated at the right in Fig. 4. At about the same time, the arm 61 which forms a cover for the top of the pocket is raised, carrying with it the stripping disc, and the date then lies loosely in the pocket which is open at the top and extreme outer end. When the air passage through the pocket registers with the port 81 in the valve chamber, the valve is moved downwardly from its seat and an air blast enters the pocket from below and throws the pitted date into the receiving chute 83.

By reason of the extremely sticky, gummy character of dates, it is essential that the parts of the mechanism which come in contact therewith should be kept thoroughly clean and since the dates are food products, these parts should be frequently sterilized. Accordingly, the second valve chamber similar to that illustrated in Fig. 2 is mounted on the upper end of the housing at a point beyond the point of date ejection. This valve chamber is supplied with steam under a substantial pressure. As the pocket from which the pitted date has been freed advances toward the place where the steam valve is located, the centering blades 39 are advanced into the empty pocket, the arm 61 associated with that pocket is lowered and the pitting plunger 33 is moved forward into the pocket. When the passage leading into the pocket registers with the passage from the steam valve, the valve is opened and the blast of steam enters the pocket, cleaning the walls of the pocket, the ends of the centering blades 39, the pitting plunger, the concavity on the under surface of the outer end of the arm 61 and the stripping disc and associated parts. This blast of steam removes any sticky date substance which may adhere to these parts of the mechanism and sterilizes the parts. Beyond the cleaning station, the centering blades 39 are moved back out of the pocket, the arm 61 moved to its upper position and the pitting plunger retracted, the movements of these parts being effected by proper formation of the cam grooves and cam tracks which control those parts by which the movements are effected. The moving parts which act on the date remain in the retracted or raised positions until the pocket is presented at the feeding station to receive another date, after which the cycle of operations above described is repeated.

In the construction described, the date pits are centered by a fixed blade 49 in the bottom of each pocket, a blade 65 carried in the concavity in the under surface of the rocking arm 61 and by a pair of blades 39 which advance into and engage the pit in the pocket. In some instances, it may be desirable to provide a movable centering blade in the bottom of the pocket and such a construction is illustrated in Figs. 5 and 6. In this construction, there is a movable blade 88 lying in an opening through the bottom of the pocket and provided at its lower end with lugs 89 between which lies the rounded end of a lever 90 pivotally secured to the outer wall of the depending portion of the head 21. This lever is provided with a roller 91 bearing on a cam track 46 and a spring 92 bears on the lever at the side of the pivot opposite that on which the blade 88 lies. The cam track is so formed as to cause the blade 88 to be positively retracted, the blade being yieldingly forced against the date.

It will be observed that in the machine as described, the attendant places the dates to be pitted in the successive pockets as these pockets are presented at the feeding station by rotation of the dial 21. The dates need not be placed in the pockets with any particular care since during the operation of the mechanism, the dates are forced downwardly into the pockets by the operation of the arm 61 and the date pits centered with relation to the plunger and the stripping disc by the action of the several centering blades. The parts of the mechanism are properly synchronized and timed by appropriate formation of the cam tracks and grooves so that after a date has been placed in a pocket, it is centered in the pocket, then the pit is centered, the pit ejected, the pocket opened, the date ejected and the parts cleaned, and these operations are carried on simultaneously for several pockets and successively for each pocket. The dial 21 is provided with a plurality of pockets, for example, a dozen and the interval between the time when a date is placed in a pocket and that pocket returned empty to be filled again is sufficient to permit the series of operations above described. Since the parts are thoroughly cleaned and sterilized after each pitting operation, the machine does not tend to become clogged or gummed by date substances and dates can be pitted at a rate as high as 96 per minute.

Should a date having a pit which is broken or of irregular shape or size so that it cannot be properly centered be placed in a pocket, it sometimes happens that the pitting plunger will be unable to force this pit through the stripping disc. Whenever this occurs, the resistance offered in the operation of the plunger is sufficient to cause the spring-pressed pins 17 to ride out of the notches in the plates 16 secured to the driving gear 15 and during the brief interval of rest in the machine, the attendant can shut down the driving mechanism. Preferably the machine is driven by an electric motor provided with a control switch located conveniently to the attendant at the pitting station and this motor is preferably reversible so that should a pit become jammed in the mechanism for any of the reasons above mentioned, the attendant can stop the motor and run the machine backwards sufficiently to retract the centering blades and pitting plunger and raise the arm 61 over the pocket in which the date with the irregular pit is carried. The date can then be lifted out of the pocket and the machine started with only a brief delay.

What I claim:

1. A fruit pitting machine which comprises a continuously advancing conveyor having a plurality of pockets for fruit to be pitted, means associated with each pocket for centering the fruit therein, centering the pit, and ejecting the pit, and intermittently actuated pneumatic means independent of the conveyor and disposed at one point in the path of travel thereof for ejecting the pitted fruit from the pockets.

2. A fruit pitting machine which comprises a conveyor having a plurality of pockets for fruit to be pitted, means associated with each pocket for centering the fruit therein, centering the pit, and ejecting the pit, pneumatic means for ejecting the pitted fruit from the pockets, and means on the conveyor for intermittently actuating said pneumatic means.

3. A fruit pitting machine which comprises a continuously moving conveyor having a plurality of elongated pockets for reception of individual fruit to be pitted, means on the conveyor associated with each pocket for centering the fruit in the pocket, means for centering the pit within said fruit, a reciprocable pitting plunger on the conveyor, permanently associated with each pocket movable in the plane of movement of the conveyor and operable to remove the pit endwise from the fruit, and means for removing the pitted fruit from the pockets.

4. A fruit pitting machine which comprises a conveyor having a plurality of pockets for fruit to be pitted, means associated with each pocket for centering the fruit therein, centering the pit within the fruit, and ejecting the pit, a supply of air under pressure, a valve controlling the air flow, means for directing air from the supply into a pocket to remove the pitted fruit therefrom, and means on the conveyor for opening the valve intermittently to cause ejection of fruit from successive pockets.

5. A fruit pitting machine which comprises a conveyor having a plurality of pockets for fruit to be pitted, means associated with each pocket for centering the fruit therein, centering the pit within the fruit, and ejecting the pit, pneumatic means for ejecting pitted fruit from the pockets by an air blast, a discharge chute for receiving the ejected fruit, and muffling means for silencing said blast mounted on the chute and receiving the blast therefrom.

6. A fruit pitting machine which comprises a dial having a plurality of pockets for fruit to be pitted, means on the dial and permanently associated with each pocket for centering the fruit therein, centering the pit within the fruit, and ejecting the pit, means for ejecting the pitted fruit from the pockets, a steam blast device for cleaning those parts of the mechanism with which the fruit contacts during the pitting operation, said device including a control valve, and means on the dial for opening the valve intermittently to clean the groups of parts successively.

7. In a fruit pitting machine, a conveyor having a plurality of elongated pockets for the reception of fruit to be pitted, separate means on the conveyor associated with each pocket for centering the fruit therein and for centering the pit within the fruit, and a plurality of pitting plungers mounted on the conveyor in alignment with the pockets, one for each pocket, each plunger moving into and out of each pocket in the plane of movement of the conveyor and in its inward movement removing the pit from the fruit therein.

8. In a fruit pitting machine, a conveyor having a plurality of pockets for the reception of fruit to be pitted, a pair of movable blades in opposite side walls of each pocket, a stationary blade in the bottom of the pocket, a movable blade at the top of the pocket, means for causing the side wall blades to approach each other to center the pit in the fruit in said pocket in vertical plane, means for causing the top blade to cooperate with the bottom blade to center said pit in a horizontal plane, and means movable into the pockets to eject the centered pit.

9. In a fruit pitting machine, a conveyor having a plurality of pockets for the reception of fruit to be pitted, a pair of movable blades in opposite side walls of each pocket, levers engaging said blades, means for moving the levers to move the blades apart, springs for forcing the blades toward each other to engage the fruit in the pocket to center the pit in one plane, blades for centering the pit in a plane at right angles to the first, and a plurality of means, one for each pocket, for removing the centered pit.

10. In a machine for pitting dates, a dial having a plurality of peripheral pockets for the reception of fruit to be pitted, each pocket having only one side and its outer end open a single element movable to close both said side and outer end of the pocket after the fruit is in place therein, cooperating means mounted in the walls of the pocket and in said element for centering the pit in the fruit in said pocket, and means for ejecting the pit through said outer end of the pocket.

11. In a fruit pitting machine, a dial having a plurality of peripheral pockets for the reception of fruit to be pitted, each pocket having an open top and outer end, an arm for each pocket movable to close the top and outer end of the pocket after the fruit is in place therein, said arm having an opening in the part closing the outer end of the pocket, and means for ejecting the pit through said opening.

12. In a fruit pitting machine, a dial having a plurality of peripheral pockets for the reception of fruit to be pitted, each pocket having an open top and outer end, an arm for each pocket movable to close the top and outer end of the pocket after the fruit is in place therein, said arm carrying a stripping member lying in front of said outer end of the pocket when the arm is in closing position, and a plunger for forcing the pit through said member.

13. In a fruit pitting machine, a dial having a plurality of peripheral pockets for the reception of fruit to be pitted, each pocket having an open top and outer end, an arm for each pocket movable to close the top of the pocket, said arm having an end portion acting to close the outer end of the pocket, a stripping member carried by the end portion of the arm and having an opening therethrough, said member being removable from the arm, and a plunger for forcing the pit through said member.

14. In a fruit pitting machine, a dial having a plurality of peripheral pockets for the reception of fruit to be pitted, each pocket having an open top and outer end, an arm for each pocket movable to close the top of the pocket, said arm having an end portion acting to close the outer end of the pocket, a perforated stripping member of resilient material removably mounted in the end portion of said arm, and a plunger for forcing the pit through said member.

15. In a fruit pitting machine, a dial having a plurality of peripheral pockets for the reception of fruit to be pitted, each pocket having an open top and outer end, an arm for each pocket movable to close the top of the pocket, said arm having an end portion acting to close the outer end of the pocket, a perforated rubber disc removably mounted in the end portion of said arm, and a plunger for forcing the pit through the perforation.

16. In a fruit pitting machine, a dial having a plurality of peripheral pockets for the reception of fruit to be pitted, each pocket having an open top and outer end, an arm for each pocket movable to close the top of the pocket, said arm having an end portion acting to close the outer end of the pocket, a stripping member mounted in the end portion of said arm and having a passage therethrough, and a plunger movable toward the member to force the pit from the fruit and through said member, the end of said plunger entering said passage in the extreme position of said plunger.

17. In a fruit pitting machine, a dial having a plurality of peripheral pockets for the reception of fruit to be pitted, each pocket having an open top and outer end, an element movable to close the top and outer end of the pocket, said element entering the pocket to center the fruit therein, and having a stripping member at the outer end of the pocket, and means for forcing the pit through said member.

18. In a fruit pitting machine, a dial having a plurality of peripheral pockets for the reception of fruit to be pitted, each pocket having an open top and outer end, an element movable toward the pocket and carrying a blade operable to center the pit in said fruit, said element also carrying a stripping member closing the outer end of the pocket, and means for forcing the pit from said fruit through said member.

19. In a fruit pitting machine, a dial having a plurality of peripheral pockets for the reception of fruit to be pitted, each pocket having an open top and outer end, an arm movable toward and away from the pocket and having a portion closing the top of the pocket and engaging and centering the fruit therein and also centering the pit in said fruit, said arm having another portion movable in front of the outer end of the pocket and carrying a stripping member, means movable into the pocket to center the pit of the fruit therein, and a plunger for ejecting the centered pit through said member.

20. In a fruit pitting machine, a dial having a plurality of peripheral pockets for the reception of fruit to be pitted, each pocket having an open top and outer end, an arm pivoted on the dial adjacent each pocket and swingable to a position in which it closes the top end of the pocket, a blade on the arm for engaging and centering the pit of the fruit in said pocket, a stripping member carried by said arm and movable by the arm to a position at the end of the pocket, means movable into each pocket for centering the pit of the fruit therein, and a plunger for each pocket, movable to force the centered pit through the stripping member.

21. In a pitting machine, a dial having a plurality of pockets for individual fruit, an arm adjacent each pocket movable to hold the fruit therein and carrying a stripping member movable by the arm to a position at one end of the pocket, centering blades for each pocket movable toward the pit to center the latter, a plunger for each pocket movable to force the centered pit through the member, means for rotating the dial, and stationary cam means for actuating the arms, blades and plungers.

22. In a fruit pitting machine, a conveyor having a pocket for fruit to be pitted, a perforated rubber disc, a movable mounting for the disc including an arm serving in one position as a closure for said pocket along one side, means for moving the mounting to bring the arm into closing position with the disc aligned with the pocket, and a plunger movable in the plane of the conveyor into the pocket and through the perforation in the disc for forcing the pit from fruit in the pocket.

23. In a fruit pitting machine, the combination of a member having a pocket open along one side and at one end, a movable arm serving in one position to close the pocket along said side, a mounting on the end of the arm serving to close the end of the pocket when the arm is in closing position, a perforated rubber disc in the mounting lying aligned with the end of the pocket when the arm is in closing position, a plunger movable in the pocket toward and away from the disc to force the pit from a fruit in the pocket and through the perforation in the disc, and a threaded member holding the disc in the mounting.

24. In a fruit pitting machine, a dial having a plurality of pockets open at the top and outer end, an arm for each pocket movable toward and away from the pocket, this arm having a portion closing the top of the pocket and a second portion closing the end of the pocket, a stripping member in the second portion of the arm, means for each pocket movable into the pocket for centering the pit of a fruit therein, a plunger for each pocket for forcing the centered pit through the stripping member, means for moving the arm, plunger, and centering means to inoperative position after the pit has been removed, means for ejecting the pitted fruit, means for restoring the arm, plunger, and centering means to operative position after the fruit is ejected, and means for cleaning said arm, plunger and centering means while they remain in operative position.

25. In a fruit pitting machine, a pocket for a piece of fruit, said pocket being open at one side and at one end, an element movable to close said side and end of the pocket, means movable toward and away from the axis of the pocket, and a blade on said element entering the pocket when the element is in closing position, said means and blade cooperating to engage the fruit in the pocket to center the pit within the fruit, and a plunger movable into the pocket for ejecting the pit from the fruit.

26. In a fruit pitting machine, a pocket for a piece of fruit having a fixed blade extending lengthwise along one side thereof, said pocket having an open side opposite said blade, an element movable to close the open side of the pocket and provided with a fixed blade extending lengthwise of the pocket, said blade acting in cooperation on the pit of a piece of fruit in the pocket to center the pit in one plane, a pair of opposed blades movably mounted in opposite walls of the pocket and lying in a plane at right angles to said plane, and yielding means for causing said movable blades to act in cooperation on said piece of fruit to center its pit in said second plane.

NATHAN A. CURTISS.